United States Patent [19]
Asplund

[11] 4,011,718
[45] Mar. 15, 1977

[54] GAS TURBINE CONSTRUCTION

[75] Inventor: Herbert Frederick Asplund, South Windsor, Conn.

[73] Assignee: United Technologies Corporation, Hartford, Conn.

[22] Filed: Aug. 1, 1975

[21] Appl. No.: 601,564

[52] U.S. Cl. .............................. 60/39.31; 415/189
[51] Int. Cl.² ...................... F02C 7/00; F01D 9/00
[58] Field of Search ................ 60/39.31, 39.32; 415/189, 190, 201, DIG. 3, 136; 417/360

[56] References Cited
UNITED STATES PATENTS

| | | | |
|---|---|---|---|
| 2,488,867 | 11/1949 | Judson | 415/136 |
| 2,843,357 | 7/1958 | Spindler | 415/189 |
| 2,851,246 | 9/1958 | Nichols | 415/170 R |
| 2,916,874 | 12/1959 | Worobel | 60/39.31 |
| 2,998,959 | 9/1961 | Haworth | 416/221 |
| 3,423,071 | 1/1969 | Noren | 415/189 |
| 3,455,537 | 7/1969 | Kozlin | 416/96 |
| 3,752,598 | 8/1973 | Bowers | 415/173 B |
| 3,842,595 | 10/1974 | Smith | 415/189 |

Primary Examiner—Carlton R. Croyle
Assistant Examiner—L. J. Casaregola
Attorney, Agent, or Firm—Vernon F. Hauschild

[57] ABSTRACT

A gas turbine consisting of alternate stators and rotors so fabricated that all stator vanes, all rotor blades and all blade tip seals may be removed through the engine case without requiring disassembly or translation of major portions of the gas turbine engine.

18 Claims, 8 Drawing Figures

GAS TURBINE CONSTRUCTION

BACKGROUND OF THE INVENTION

Field of Invention

This invention relates to gas turbine engines and more particularly to such engines which have turbine assemblies so constructed that, with a portion of the engine case removed, all airfoil members of the turbine may be removed without disassembling other engine parts.

DESCRIPTION OF THE PRIOR ART

While there are patents in the prior art which teach gas turbine construction in which combustion chambers, and some select portions of the turbine can be removed without disassembling the remainder of the engine, it is believed that the prior art does not teach a construction in which all airfoil members and blade tip seals of the turbine can be removed without disassembly of any other engine parts.

SUMMARY OF THE INVENTION

It is the object of this invention to provide a turbine for a gas turbine engine which is so fabricated that all turbine airfoil vanes, blades and blade tip seals may be removed through an access hole in engine case without disassembling any other portion of the engine.

In accordance with the present invention, all airfoil parts and seals so removed can be replaced utilizing a reassembly procedure which is the exact reverse of the disassembly procedure, with disassembly and reassembly permissible from a forward access position. The present invention teaches a turbo machinery stator construction which prevents vane twisting during operation and which minimizes parasitic leakage across the stator. This stator construction also provides minimum eccentricity between the cooperating seal members carried by the stator and its associated rotor. This stator construction is also of a multi-piece construction so that no single part is required to withstand substantially different temperatures in different areas thereof and so that materials suitable for the particular temperature range of operation can be chosen for each part for maximum performance without unduly stressing the stator parts. This stator construction may be fabricated of minimum tolerance to insure minimum parasitic leakage.

In accordance with a further aspect of the present invention, all turbine airfoil parts are fabricated and supported so that they may be removed from the engine by freeing them and moving them axially forward.

In accordance with still a further aspect of the present invention, most turbine airfoil parts and their support assemblies can be removed from the engine by freeing them from rearward access position and moving them axially rearward.

Other objects and advantages of the present invention may be seen by referring to the following description and claims, read in conjunction with the accompanying drawings.

DESCRIPTION OF THE PREFERRED EMBODIMENT

Figure 1:
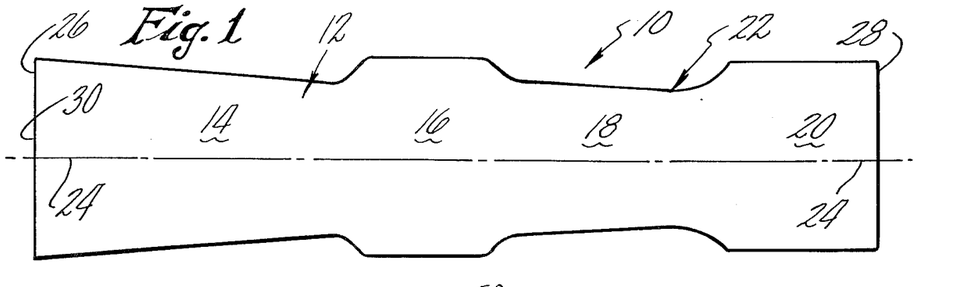
FIG. 1 is a side view of a typical gas turbine engine with free turbine which could utilize the turbine of this invention.

Referring to FIG. 1 we see gas turbine engine 10, which is preferably of the free turbine type and consists basically of a gas generator portion 12 comprising either an axial flow or centrifugal compressor 14, a combustion section 16, a turbine section 18 and a free turbine 20. Engine 10 is enveloped within case 22, which is preferably of circular cross section and concentric about engine axis or centerline 24. In conventional manner, air enters inlet 26 of case 22, is compressed in passing through compressor section 14, is heated and has energy added thereto in passing through burner 16, has sufficient energy extracted therefrom in passing through turbine section 18 to drive compressor 14, and is then discharged through free turbine 20. Free turbine 20 is mechanically connected to drive a drive shaft which may either extend from the rear end 28 of engine 10 to drive any work generating device, such as an electric generator or a gas pump, or the drive shaft may extend forwardly and out through the front or forward end 30 of engine 10 to drive an engine propeller or be connected to appropriate shafting to drive a helicopter rotor or other rotatable mechanism, the latter arrangement may be of the type shown in U.S. Pat. No. 3,823,553.

Figure 2:
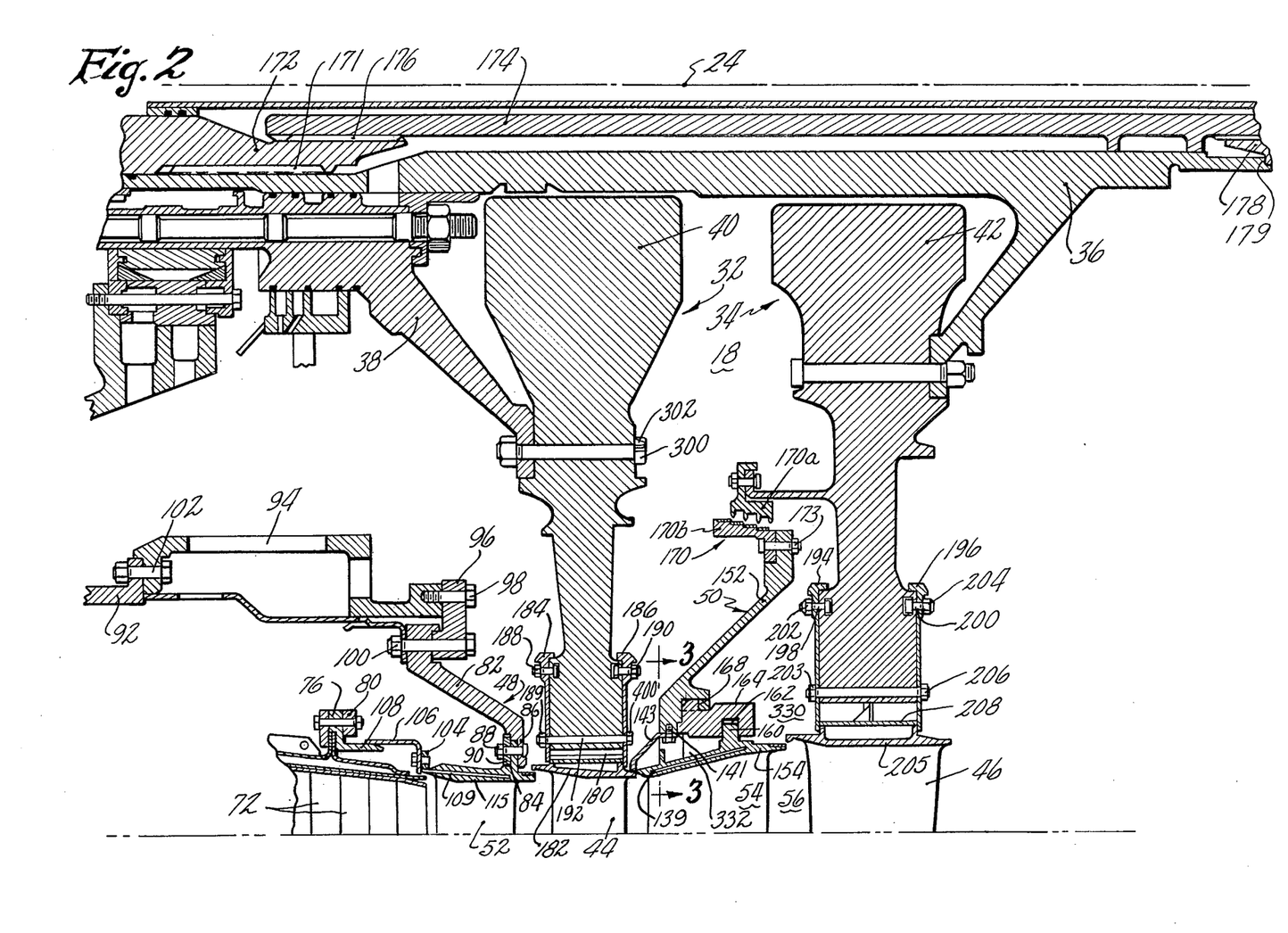
FIGS. 2 and 2A are enlarged cooperating showings through the turbine section of the FIG. 1 engine.
Figure 2A:
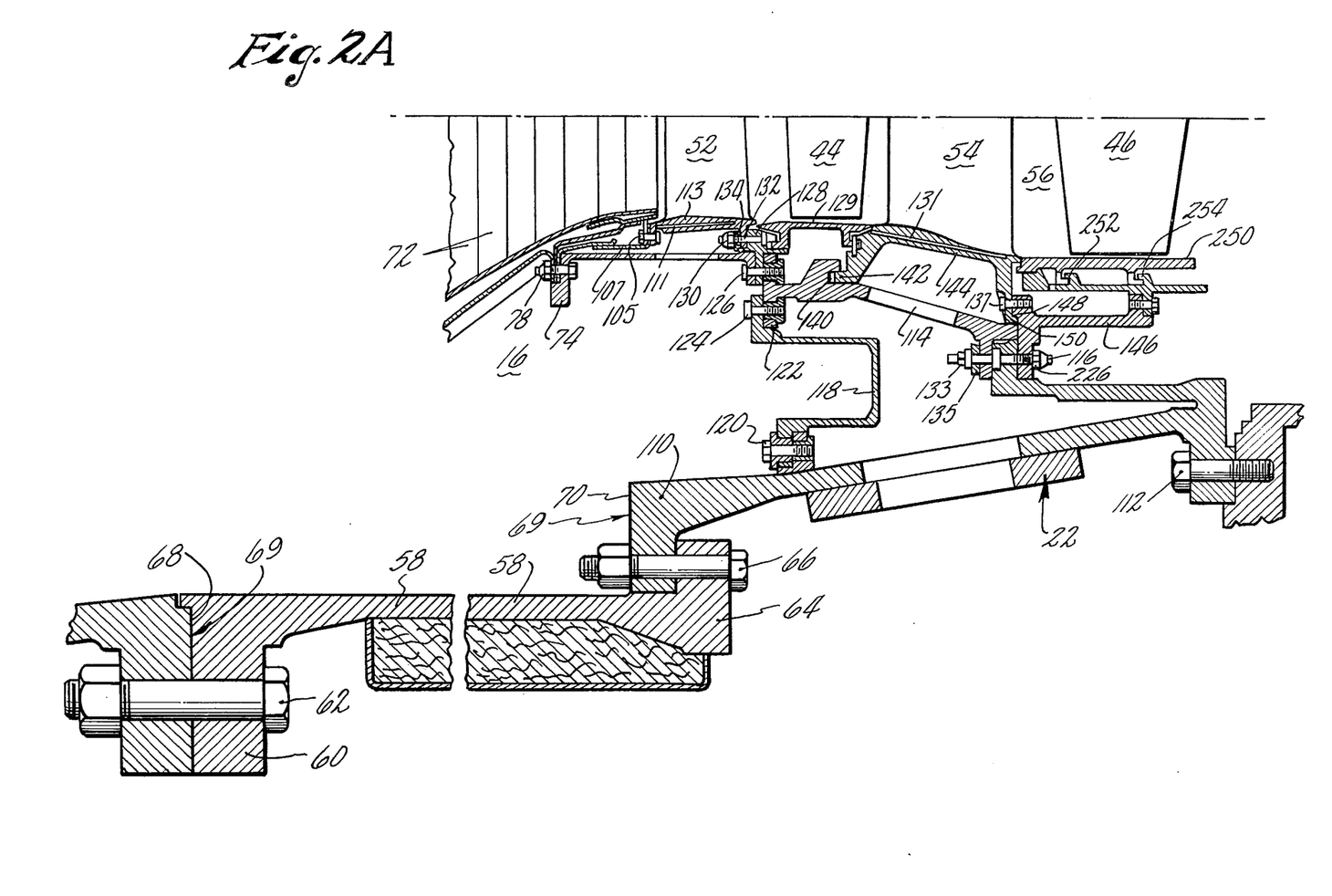

Referring to FIGS. 2 and 2A we see turbine section 18 in greater particularity. Basically turbine section 18 includes high pressure turbine rotor assembly 32 and low pressure turbine rotor assembly 34, each of which is mounted from shafting such as 36 and 38 for rotation about engine centerline or axis 24. Turbine rotor assemblies 32 and 34 include a disc member 40 and 42 which carries a plurality of turbine blades 44 and 46 about the periphery thereof, respectively. First and second stage stator assemblies, 48 and 50, are mounted concentrically about centerline 24 so that first stage stator assembly 48 is positioned forward or upstream of the high pressure turbine rotor assembly 32 and the second stage stator assembly 50 is positioned between rotor assemblies 32 and 34. Stator assembly 48 includes a plurality of first stage vanes 52 positioned circumferentially thereabout, while stator assembly 50 includes a plurality of second stage vanes 54 positioned circumferentially thereabout. Blades 44 and 46 and vanes 52 and 54 are airfoil members positioned in annular passage 56 in which the heated gases from burner section 16 pass through turbine section 18 enroute to free turbine 20.

Turbine section 18 is enveloped, in part, within cylindrical case member 58 and turbine case 110, which forms parts of engine case 22. Case 58 has a forward circumferential flange 60, which is bolted to the forward portion of case 22 by bolt member 62 and a rearward circumfential flange 64 which is bolted to the forward section of case 110 by bolt member 66. Flanges 60 and 64 project radially outwardly and inwardly, respectively, and cooperate with the remainder of case 22 so that with bolt members 62 and 66 removed, case 58 may be slid axially rearward to provide ready access between surfaces 68 and 70 to the interior of burner section 16 and forward access to turbine section 18 through space 69.

As used herein, the term "forward access" means access from a station forward thereof in the engine and "rear access" means access from a station rearward thereof in the engine.

Transition ducting 72 conducts the heated gases from combustion section 16 to annular passage 56 of turbine section 18 and is supported at its forward end in conventional fashion (not shown) to the conventionally removable combustion cans or annular chamber of combustion section 16 and is supported at its after end by transition section outer support ring 74 and transition section inner support ring 76. Bolt and nut members 78 join transition section 72 to support member 74 and are readily accessible with case 58 removed. Bolt and nut member 80 connects transition section 72 to support ring 76 and are readily accessible with case 58 removed through access ports or openings (not shown) positioned circumferentially about transition section 72. Transition duct 72 may be of the type shown in U.S. Pat. Nos. 2,702,454; 2,848,191; or 3,086,363.

First stage stator assembly 48 includes frusto-conical support ring member 82 which supports the inner end or root of vanes 52 in that flange member 84, which projects radially inwardly from each vane 52 abuts circumferential flange 86 of member 82 and has bolt holes in alignment therewith so that bolt and nut members 88 may extend therethrough to support the inner end of vanes 52. Segmented retainer plate member 90 extends a selected circumferential distance along flanges 84 and 86 so that a given nut-bolt unit 88 may position a selected number of vanes 52 due to the action of circumferentially segmented retainer plate 90. Member 48 is supported from support ring 82, which may in turn be supported from any rigid support (not shown), through ring member 94, to which member 48 may be integrally connected or may preferably be connected through connecting ring 96 by means of bolts 98 and nut-bolt arrangements 100 so that member 48 may be displaced forward to gain access to sideplate 184. Support member 94 is, in turn, supported from support ring 92 by bolt and nut members 102. Bolt-nut members 104 connect support ring 106 from the root or inner end of vane 52 so that transition duct support ring 76 is supported therefrom through slip joint 108.

The outer ends or tips of vanes 52 and 54 are generally supported from turbine case 110, which is, in turn, connected to engine case 22 by bolt-nut members 66 and 112. Turbine inner case 114 is supported from turbine case 110 by bolt-nut arrangements 116, 133 and 226 and serves to support the outer end or tip of vaneas 54 in a manner to be described hereinafter. Bulk head seal ring 118 is supported from turbine case 110 by bolt-nut members 120 and supports the forward portion of inner case 114 through nut-bolt arrangement 124. Nut-bolt arrangement 126 supports first vane outer support ring 128 and transition duct outer support 74 from support ring 122 on case 114. The outer end of each vane 52 is connected to support ring 128 by bolt-nut members 130 which extend through aligned holes in support ring 128 and radially outwardly extending flange 132 projecting from the tip of vane 52. A segmented circumferentially extending retaining plate 134, comparable to retaining plate 90, and preferably extending equal circumferential arcs therewith, is utilized so that each nut-bolt 130 retains the outer end of a selected plurality or multiplicity of vanes 52.

Second stage vanes 54 are supported at their outer ends in cantilever fashion from turbine inner case 114 which is shaped to define axially extending, circumferential recess 140 shaped and sized to receive axially extending toe member 142 of the outer platform 144 of each vane 54. Case 110 also supports support ring 146 through the action of bolt-nut member 116 and 226 and cooperates with case 114 to define axially extending, circumferential recess 148 to receive toe member 150 of vane outer platform 144.

Figure 3:
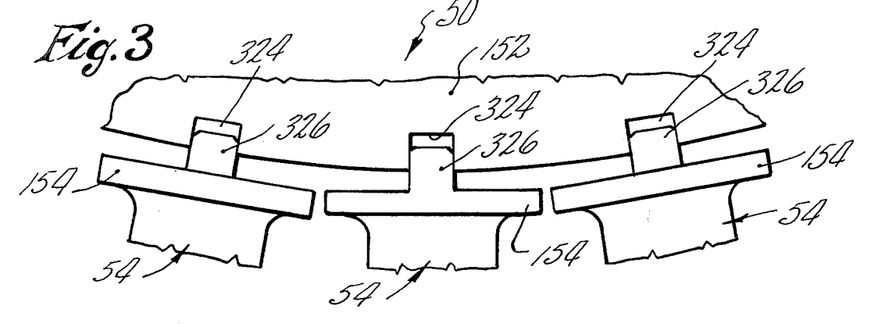
FIG. 3 is a showing through section line 3—3 of FIG. 2.

Diaphragm ring 152 of assembly 50 is supported from the inner platform 154 of vanes 54 due to a spline connection between platforms 154 and member 152, as best shown in FIG. 3. Inner platform 154 also includes radially inwardly projecting member 160, which are received in mating engagement in circumferential recess 162 in ring member 164, which is connected to conical member 152 through bayonet connection 168. The purpose of ring member 164 is to avoid the stress which would be created if diaphragm member 152 were made as a single piece in view of the fact that the various portions of a one-piece diaphragm 152 would be operating in substantially different temperature zones. With the two-piece construction, mainly members 152 and 164, these parts can be fabricated of material which is capable of withstanding the temperature in the zone at which it must operate, part 164 being subjected to much higher temperatures and without undue stress due to differential thermal movements. The stator construction in this area will be better understood by viewing FIGS. 5, 6, and 7.

Figures 4, 5, 6, 7:
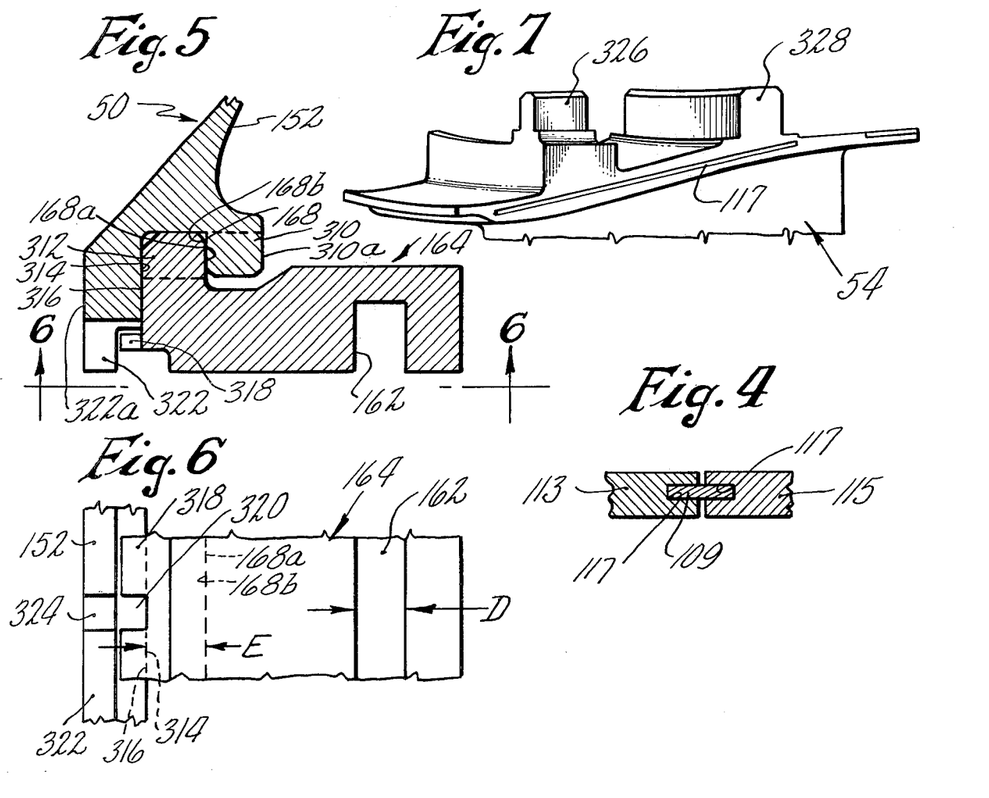
FIG. 4 is a showing through adjacent inboard platforms of first stage vanes 52 to show the construction of the feather seal.
FIG. 5 is an enlarged showing of a portion of the connection between the second stage stator vanes and its diaphragm member in the second stage stator assembly.
FIG. 6 is a view taken along the line 6—6 of FIG. 5.
FIG. 7 is a perspective showing of the inner end of the second stage vanes to show their lug constructions.

First viewing FIG. 5, we see ring member 164 connected to diaphragm member 152 through bayonet connection 168. Bayonet connection 168 is of conventional design in that spaced tooth members 310 project radially outwardly from diaphragm ring 152 and are spaced so that radially inwardly projecting spaced tooth members 312 of ring 164 can be moved axially between teeth 310 until a continuous, circumferential sealing surface is generated by the abutment of surfaces 314 and 316, and then ring 164 can be rotated about axis 24 to bring teeth 310 and 312 into substantial axial alignment and hence lock ring 164 and diaphragm 152 with respect to each other axially.

Ring 164 also includes ring 318 projecting axially forward from surface 316 and extending concentrically around axis 24. Ring 318 has a plurality of radially extending slots 320 (see FIG. 6) in spaced circumferential relationship or array thereabout, while ring portion 322 of diaphragm 152 has corresponding radially outwardly opening slots 324 in the outer periphery thereof so that ring 164 can be rotated to bring slots 320 and 324 into axial coincidence and serve to form a circumferential array of axially extending female cavity in which to receive an axially extending lug 326 (see FIG. 7) projecting inwardly from the forward end of vane 54. Vane 54 also has circumferentially extending lug 328 at its aft end which is received in circumferentially extending, radially opening slot 162 in ring 164. It will therefore be seen that with ring member 164 and diaphragm 152 assembled as shown in FIGS. 5 and 6, each vane 54 can be connected thereto by having vane lugs 326 and 328 received in slot combination 324–320 and slot 162, respectively. This serves to lock ring 164 from rotation with respect to vanes 54 and diaphragm 152 and therefore locks the bayonet connection 168.

There are several advantages to be gained by the stator construction of FIGS. 5–7 just described. One such advantage is the fact that the circumferentially extending vane lug 328 is snuggly received in circumferentially extending ring groove 162, which prevents twisting of the vane and thereby ensures that it is always in proper aerodynamic orientation in gas passage 56 and also prevents parasitic leakage between surfaces 314 and 316 from areas 330 to 332 (see FIG. 2). In addition, in view of the fact that the plurality of axially extending lugs 326 on the forward end of vanes 54 being received in aligned slots 324–320, which is actually a circumferential spline connection between vanes 54 and members 164 and 152, this circumferential spline connection will provide for minimum eccentricity between the rotor portion 170a and the stator portion 170b of seal 170. This stator construction, which includes the two separate pieces 152 and 164 operating in substantially different temperature zones, will permit fabricating piece 164 from a different material than piece 152, thereby permitting a selection of materials which will provide the necessary temperature tolerance and yet provide structural integrity and lightness of weight. If diaphragm assembly 152 were one piece, i.e., if members 152 and 164 were integral, this advantage would not be possible and substantial stress would ensue due to relative thermal movement. Further, since dimension E shown in FIG. 6 between mating surfaces 314–316 and 168a and 168b is minimum in this design, differential thermal growth between parts 164 and 152 in an axial dimension is of minimal concern from a stress standpoint and, in view of the fact that the aforementioned mating surfaces between parts 162 and 164 are radially extending, relative radial thermal motion between parts 152 and 164 is permitted in this design without stressing either part and while maintaining the necessary structural relationship therebetween. It will be realized if substantial relative axial thermal motion occurred between parts 152 and 164, the aforementioned parasitic leakage would occur in that surfaces 314 and 316 would be drawn out of their normal complete circumferential, sealing contact. In addition, the small axial dimension D of groove 162 (see FIG. 6) and the corresponding dimension of vane lug 328 minimizes the effect of relative axial thermal expansion between the vane 54 and ring 164 so that the mating of tab 328 in slot 162 further serves to prevent the aforementioned parasitic leakage between areas 330 and 332. This stator design provides the additional advantage that the parts involved are easy to machine in that the walls of slot 162 and surfaces 168a and 316 in ring 164 are parallel, as are surfaces 322a, 316, 168b and 310a in diaphragm 152.

Ring member 152 supports the fixed portion of air seal assembly portion 170 at its inner end, due to bolt-nut connection 173.

While rotor assemblies 40 and 42 are shown to be supported for separate rotation by shafts 36 and 38, and this is the preferred arrangement to drive a twin spool, axial flow compressor, it should be borne in mind that these rotors could be supported and driven in any preferred manner such as in unison, for counter-rotation, or any preferred arrangement without departing from the spirit hereof.

Shaft 36 is connected by spline connection 171 to shaft 172, which leads directly or indirectly to drive compressor section 14. Nut member 174 threadably engages shaft 172 at thread connection 176, and clamps shaft 36 at surface 179 on nut 178.

Disc 40 of rotor 32 includes a plurality of conventional circumferential fir-tree or other type blade receiving slots in its outer periphery so that matingly shaped fir-tree or other shaped roots of blades 44 may be axially slid into each such fir-tree slot in disc 40 as shown, for example, in U.S. Pat. No. 2,686,656 or 2,801,704. A conventional blade damper 188 is positioned between the inner platform 182 of adjacent blades 44 and bears thereagainst for vibration damping purposes. The roots of blades 44 and dampers 180 are axially positioned in disc 40 between front sideplate 184 and rear sideplate 186. Bolt or nut-on-stud members 188 and 190 retain the sideplates to the disc front and rear surfaces adjacent the blade roots, while studs 192 extend through the sideplates for retention purposes at a radially outboard station. Sideplates 184 and 186 are preferably circumferentially segmented to retain a selected number of blades 44 and for ease of assembly and disassembly.

Second stage blades 46 are similarly attached to the outer periphery of disc 42 of rotor assembly 34 through a fir-tree or other conventional connection between the roots of blades 46 and corresponding root receiving slots in the periphery of disc 42 so that blades 46 may be axially slid into position and then retained in position by segmented sideplates 194 and 196, which are retained on studs 198 and 200 by nuts 202 and 204. Stud 206 performs a similar function to stud 192, and blade vibration dampers 208 are positioned between the root platforms 205 of adjacent blades 46 and are axially retained between circumferentially segmented sideplates 194 and 196.

Rotors 32 and 34 may be of the type shown in U.S. Pat. No. 3,455,537; 3,666,376 or U.S. Pat. application Ser. No. 455,838 filed Mar. 28, 1974 on Gas Turbine Constructions by Kozlin et al and sideplates 184, 186, 194 and 196 may be of the variety shown in U.S. Pat. Nos. 2,494,658; 2,998,959; or 3,300,179.

It is an important feature of this construction that with case 58 unbolted and moved axially, all airfoil members including vanes 52 and 54 and blades 44 and 46 may be removed from the engine for repair, replacement or other needed maintenance through the forward access space provided by the translation of case 58. The removal of these airfoil members in this fashion will now be described.

By removing bolts 62 and 66, case 58 may be translated axially rearward to provide an access space 69 between surfaces 68 and 70. In conventional combustion chamber design (not shown) the combustion chambers can be either removed from the engine either from the access hole 69 or slid forward within the engine case interior chamber to give access to transition duct 72. By the removal of bolt-nut members 78 and 80, the segmented transition duct 72 can be removed through the access hole or translated forward. With transition duct 72 removed or translated forward, we now wish to remove one or more of the first stage vanes 52. To do this, bolts 126 are unbolted and the transition duct outer support case 74 is slid forward into the cavity of combustion section 16. Support ring 76 and seal ring 108 are also displaced forward into cavity of combustion section 16. The removal of bolts 104 and 105 permit the removal of first vane inner air seal 106 and outer air seal 107, respectively. The removal of seals 106 and 107, which may be rings or segmented rings, permits the axial removal of the inner and outer feather seals 109 and 111 from their capture slots 117 which are defined by abutting tip and root platforms 113 and 115 of adjacent first stage vane 52 and extend for substantially the full axial dimension thereof. A showing of a typical feather seal is shown in FIG. 4. Feather seals 109 and 111 prevent gas leakage between adjacent vanes 52. We then remove nuts 88, which frees the segmented retainer plate 90 for removal and hence frees a selected number of vanes 52 at their inner ends. By removal of nuts 130 and the segmented retaining plate 134 held in position thereby, we free the outer ends of vanes 52. Vanes 52 may then be removed axially forward and through the access hole 69. In this fashion, vanes 52 can be removed individually as desired, or in any desired numbers, or in their totality by merely removing nuts 88 and 130 and all retaining plates 90 and 134.

In the alternative, rather than removing vanes 52 individually, we could have removed nuts 100 and 130 to permit conical support member 48 and all of the vanes 52 attached thereto to be slid axially forward into the cavity of combustion section 16. Whether we remove all vanes 52 individually or we slid all vanes 52 axially forward in attachment to support member 48, we bare the blades 44 of the high pressure turbine 32 for removal. With vanes 52 so removed, the removal of first stage turbine blades 44 will now be described.

To remove blades 44, it is first necessary to detach as previously described, support ring 48 and translate it forward into the combustion chamber cavity. To free the roots of blades 44, segmented sideplate 184 is removed. To accomplish this, nuts 188 and 189 are first removed to permit the removal of the segmented sideplate 184. Blade vibration dampers 180. which may be of any conventional design extending between sideplates 184 and 186 and bearing against the under surface of the root platforms 182 of blades 44, can then be slid axially forward from between blades 44. With the damper so removed, the individual blades 44 may then be slid axially out of their fir-tree or other root attachment to disc 40. Stud 192 is securely held in disc 40. With blades 44 so removed, we will now proceed to remove vanes 54.

With vanes 52 and blades 44 so removed, if we are to remove outer air seals 129, feather seals 131 and vanes 54, we must first remove first vane outer support ring 128, then remove circumferentially segmented air seal 129. This bares for removal outer vane feather seals 131, which are similar in construction to the feather seals shown in FIG. 4. Next, bolts 124 and 120 are removed to free the forward bulk-head seal ring 118 and permit it to be axially translated forward into the combustion chamber compartment. Nuts 133 are then removed from nut-bolt unit 116 to free seal plate segments 135 to permit the translation of the inner turbine case 114 forwardly into the combustion chamber compartment. Bolts 137 are then removed. Vanes 54 are displaced axially forward slightly with the inner diaphragm member 152 still attached, to free platform 144 from air seal 250 and vaness 54 are then slid radially outwardly within the spline connection of FIG. 3 to permit the removal of the vane inner feather seals 139, which may be of the FIG. 4 variety. The second stage vanes 54 may then be removed individually.

To remove blades 46, we first slide diaphragm member 152 axially forward after first removing bolts 141 and segmented air seal ring 143. Segmented sideplate 194 is next removed by removing nuts 202 and 203. The second blade damper 208, which may be the same type damper as 180 for blades 44, is then slid forwardly for individual removal. Blades 46 may then be slid axially forward from their fir-tree or other conventional attachment to disc 42. If, to permit the removal of blades 46, additional axial clearance is needed forward thereof, ring member 164 may be disconnected from diaphragm 152 by the action of the bayonet joint 156 therebetween and moved out of axial alignment with blades 46. The second stage blade outer air seal 250, which is circumferentially segmented, may be removed by sliding it axially forward to disengage hooks 252 and 254, then removing the individual segments of seal 250 through their ship lap connection.

It will therefore be seen that through the access space 69 created by the removal of case 58, forward access is provided to turbine section 18 and all of the airfoil members 52, 44, 54, and 46 of turbine section 18 can be removed and replaced without disturbing any other portion of engine 10.

It will be evident to those skilled in the art that reassembly of airfoil members 46, 54, 44, and 52 and seals 111, 129, 131, and 250 may be accomplished by reversing the procedure just described for their disassembly.

As stated earlier, many of the parts of turbine 18 can be removed from engine case 22 when rearward access is available thereto as now to be described.

The first step in rearward disassembly of turbine 18 would be the removal of nut 178. This permits the removal as a unit of shaft 36 and second stage or low pressure turbine rotor assembly 34 due to the presence of spline connection 171. It will be evident that if we merely wished to remove one or more of blades 46, sideplates 196 could have been removed by the removal of nuts 204 and 206 to permit removal rearwardly of one or all of blades 46.

With low pressure turbine rotor 34 removed as described, nuts 226 can be removed to thereby permit the axially rearward removal of outer air seal 250, outer air seal support 146, and second stage stator assembly 50 and first stage outer air seal 129 as a unit, for later disassembly to any desired extent as previously described.

Next, if first stage turbine rotor assembly 32 is to be removed, tab locks 302 can be opened to permit the removal of bolts 300 and thereby permit the axially rearward removal of the first stage turbine rotor assembly 32. If, in the alternative, we merely wish to remove one or more blades 44 from rotor assembly 32, this can be done by either forward or rearward access. The forward access removal was previously described and the rearward axis removal would entail the removal of nuts 190 and 400, sideplate 186 and then after removing dampers 180, the removal of the individual blades 44.

If first stage vanes 52 and the other portions of first stage stator assembly 42 are to be removed, case 58 must be released and moved axially rearwardly as previously described and vanes 44 and the other portions of stator assembly 48 removed through access hole 69 as previously described.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A gas turbine engine having a compressor section, a combustion section, and a turbine section positioned in axial alignment along the engine axis and enveloped within the engine casing and including:
   A. means providing forward access to the turbine section through the engine case,
   B. said turbine section including:
      1. a first stage stator assembly having:
         a. a row of first stage, radially extending stator vanes arranged circumferentially about the engine axis,
         b. means supporting said first stage vanes,
         c. means connecting said first stage vanes to said support means and fabricated to permit connecting and disconnecting of said first stage vanes to said first stage vane support means from a forward access position and so that said first stage vanes may be removed through said case access when disconnected,
         d. means to support a portion of said support means so that it may be disconnected from a forward access position and translated axially forward,
      2. a first stage turbine rotor assembly positioned immediately axially downstream of first stage stator assembly and including:
         a. a disc mounted for rotation about the engine axis,
         b. a plurality of radially extending blades positioned circumferentially about the periphery of said disc and in axial alignment with said first stage vanes to receive engine gases therefrom,
         c. means connecting said blades to the disc periphery so that the first stage blades may be received in the first stage disc by axial motion of the blade from a forward access position,
         d. means for locking said first stage blades in said first stage disc,
         e. means connecting said locking means to said first stage rotor and fabricated to be connected or disconnected from a forward access position so that with the connecting means disconnected, the locking means may then be removed, and then the first stage blades may be moved axially forward and freed from their connection to the first stage disc for removal through the engine case access after said first stage vanes have been removed and said first stage vane support means portion has been translated axially forward,
      3. a second stage stator assembly positioned immediately axially downstream of said first stage rotor assembly and including:
         a. a row of radially extending second stage vanes positioned circumferentially about said axis and in axial alignment with and downstream of said first stage blades to receive engine gases therefrom,
         b. means for supporting said second stage vanes,
         c. means for connecting said second stage vanes to said second stage vane support means fabricated so that the second stage vanes may be connected to the second stage vane support means from a forward access position and so that with said second stage vane connecting means removed, said second stage vanes may be removed from said second stage stator assembly and through the engine case access with said first stage vanes so removed,
      4. a second stage turbine rotor assembly positioned immediately downstream of second stage stator assembly and including:
         a. a disc mounted for rotation about the engine axis,
         b. a plurality of radially extending second stage blades positioned circumferentially about the periphery of said disc and in axial alignment with said second stage vanes to receive engine gases therefrom,
         c. means connecting said blades to the disc periphery so that the second stage blades may be received in the second stage disc by axial motion of the blade from a forward access position,
         d. means for locking said second stage blades in said second stage disc,
         e. means connecting said locking means to said second stage rotor and operable to be connected or disconnected from a forward access position so that with the connecting means is disconnected, the locking means may then be removed, and then second stage blades may be moved axially forward and freed from their connection to the second stage disc for removal through the engine case access with said first and second stage vanes and said first stage blades so removed.

2. An engine according to claim 1 wherein said turbine section access providing means is a portion of the engine case including a case member of circular cross section extending along the engine axis and forming a portion of the engine case and being shaped to be connected to the remainder of the engine case so that when disconnected therefrom the case portion can be translated axially with respect to the remainder of the engine case to provide access to the turbine section.

3. An engine according to claim 2 wherein said first stage vane support means includes:
   A. means supporting the first stage vane tip ends connected to the vane tips by connecting means operable from a forward access position,
   B. means supporting the root end of said first stage vanes including:
      1. a diaphragm member in the form of a ring member projecting inwardly toward the engine axis from the vane roots and connected thereto by connecting means operable from a forward access position,
   C. means supporting the other end of said diaphragm member, and
   D. connecting means operable from a forward access position connecting said support means to said other end of said diaphragm means so that, with said vane outer support means disconnected and said diaphragm member disconnected from said support means, said diaphragm member and all of said first stage vanes may be translated as a unit axially forward so as to give forward access to said first stage rotor assembly, or so that with said first stage vanes removed, said diaphragm member may be translated axially forward to give forward access to said first stage rotor assembly.

4. An engine according to claim 3 wherein said first stage blades are connected to said first stage disc through a fir-tree type root connection and including:
  A. a circumferentially segmented sideplate ring member located on the forward side of said first stage rotor disc and extending radially therealong throughout the region of blade-to-disc connection, and
  B. means connecting said sideplate to said disc and fabricated to be operable from a forward access position to connect the sideplate to or disconnect the sideplate from the disc and, further, so that with the sideplate so disconnected, the sideplate segments can be removed from the disc and the first stage blades can then be disconnected from the first stage disc by axial forward motion of the blades for removal through the engine case access.

5. An engine according to claim 4 wherein said second stage stator assembly is supported from said engine case and wherein said second stage vanes include inner and outer platforms and comprising:
  1. vane support means supported from said engine case and shaped to define a rearwardly opening circumferential slot and a forwardly opening circumferential slot spaced axially downstream of the rearward opening circumferential slot,
  2. each of said vane outer platforms including a forwardly directed leading edge toe adapted to be matingly received in said rearwardly opening circumferential slot and a rearwardly directed trailing edge toe adapted to be matingly received in said forwardly opening circumferential slot so as to support each of said vanes from said support means,
  3. connecting means operable from a forward access position connecting said vane support means to said engine case,
  4. a diaphragm member projecting radially inwardly from said inner platforms of said vanes so supported, connected thereto and supported therefrom through a substantially radially extending spline connection shaped to permit radially outward movement of the second stage vanes from th diaphragm member for disassembly therefrom after the vane outer end is disconnected from said second stage vane support means.

6. An engine according to claim 5 wherein said second stage blades are connected to said second stage disc through a fir-tree type root connection and including:
  A. a circumferentially segmented sideplate ring member located on the forward side of said second stage rotor disc and extending radially therealong throughout the region of blade-to-disc connection, and
  B. means connecting said sideplate to said disc and fabricated to be operable from a forward access position to connect the sideplate to or disconnect the sideplate from the disc and, further, so that with the sideplate so disconnected, the sideplate segments can be removed from the disc and the second stage blades can then be disconnected from the second stage disc by axial forward motion of the blades for removal through the engine case access.

7. An engine according to claim 6 wherein said first stage vanes include inner and outer platform and said second stage vanes include outer platforms having cut-out portions in adjacent vanes cooperating to define an axially extending cavity extending across the platforms circumferential gap and having an opening in the vane forward end, and further including a vane feather seal positioned in each of said cut-outs to prevent gas leakage between said blade platforms and to permit insertion and removal of each of said feather seals through said forward opening in said cut-out portions.

8. An engine according to claim 7 wherein said first and second stage blades include a tip end at their radially outer ends when mounted from said discs and including:
  A. segmented tip seal rings mounted to concentrically envelop the blade tips of said first and second stage blades so mounted,
  B. means supporting said tip seals in position, and
  C. connecting means operable from a forward or rearward access position to sequentially disconnect said tip seal support means and said tip seals of said first stage blades, then said tip seal support means and said tip seal of said second stage blades for removal through said engine case access.

9. An engine according to claim 5 wherein the vanes of said second stage stator include a radially inwardly projecting member projecting from the inner platform thereof and wherein said second stage stator assembly further includes a ring member having an outwardly opening circumferential groove therein sized to matingly receive said inwardly directed projections from said second stage vane inner platforms, and a bayonet connection connecting said ring to said diaphragm member.

10. An engine according to claim 1 wherein said locking means of said first and second stage rotor assemblies are fabricated to be connected or disconnected from either a forward or rearward access position; and further, wherein said means connecting said first stage blades to said first stage disc and said second stage blades to said second stage disc is shaped to permit removal of both the first stage and the second stage blades from their discs from either a forward access or a rearward access position, and wherein said means for connecting said second stage stator assembly vanes to said second stage vane support means are fabricated so that the second stage vanes may be connected or disconnected to the second stage vane support means from either a forward or rearward access position.

11. An engine according to claim 10 and including outer air seal means and inner air seal means extending between adjacent vanes of said first and second stage rotor assemblies and supported so as to be removable from a forward access position with respect to said first and second stage rotors.

12. An engine according to claim 11 and including outer air seal means supported about the outer periphery of the blades of said first and second stage rotors, and means supporting said rotor outer air seal means so that both rotor outer air seal means are removable from both forward and rearward access positions.

13. An engine according to claim 1 and including means supporting said second stage rotor assembly so as to be removable from said engine case from a rear access position, means supporting said second stage stator assembly so as to be removable from a rear access position with said second stage rotor removed, and means supporting said first stage rotor assembly so as to be removable from the rear access position with said second stage rotor assembly and said second stage stator assembly removed.

14. An engine according to claim 3 and including inner and outer air seals extending between adjacent first stage vanes, and means connecting said inner and outer air seals to said first stage vanes so as to be removable therefrom from a forward access position.

15. An engine according to claim 4 and including an outer air seal enveloping said first stage blades, and means supporting said outer air seal so as to be removable from either a forward or rearward access position.

16. An engine according to claim 5 and including inner and outer air seals extending between the inner and outer platforms of adjacent second stage vanes, and means supporting said inner and outer air seals in said vane platforms so that the inner and outer air seals may be assembled or disassembled into the platforms from a forward access position.

17. An engine according to claim 6 and including an outer air seal enveloping said second stage blades, and means supporting said outer air seal so as to be removable from either a forward or rearward access position.

18. A gas turbine engine having:
A. an outer case concentric about an axis,
B. a two-stage gas turbine enveloped within said outer case and comprising:
 1. axially spaced first and second stage stator assemblies,
 2. a first stage rotor assembly positioned between said stator assemblies,
 3. a second stage rotor assembly positioned immediately adjacent said second stage stator assembly and on the opposite side thereof from said first stage rotor assembly.
C. means to support said rotor and stator assemblies so that the blades of said rotor assemblies and the vanes of said stator assemblies are in axial alignment,
D. means to provide forward access to said turbine through an opening in said case,
E. means supporting the first stage vanes so that, without disassembling any other parts of said engine, the first stage vanes may be disconnected and removed through said case opening,
F. means supporting said first stage blades so that, with the first stage vanes removed and without disassembling any other parts of said engine, the first stage blades may thereafter be disconnected and removed through said case opening,
G. means supporting said second stage vanes so that, with the first stage vanes and blades removed and without disassembling any other parts of said engine, the second stage vanes may thereafter be disconnected and removed through said case opening, and
H. means supporting said second stage blades so that, with said first stage vanes and blades, and said second stage vanes removed, and without disassembling any other parts of said engine, said second stage blades may thereafter be disconnected and removed through said case opening.

* * * * *